United States Patent
Kato (10) Patent No.: US 10,479,394 B2
(45) Date of Patent: Nov. 19, 2019

(54) STEERING DEVICE OF VEHICLE

(71) Applicant: AISIN SEIKI KABUSHIKI KAISHA, Kariya-shi, Aichi-ken (JP)

(72) Inventor: Ken Kato, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 168 days.

(21) Appl. No.: 15/685,196

(22) Filed: Aug. 24, 2017

(65) Prior Publication Data

US 2018/0079445 A1 Mar. 22, 2018

(30) Foreign Application Priority Data

Sep. 21, 2016 (JP) .................................. 2016-184888

(51) Int. Cl.
| | |
|---|---|
| *B62D 1/00* | (2006.01) |
| *B62D 1/19* | (2006.01) |
| *B62D 1/185* | (2006.01) |
| *B62D 1/187* | (2006.01) |
| *B62D 5/04* | (2006.01) |
| *B62D 1/181* | (2006.01) |

(52) U.S. Cl.
CPC ............ *B62D 1/192* (2013.01); *B62D 1/181* (2013.01); *B62D 1/185* (2013.01); *B62D 1/187* (2013.01); *B62D 5/0403* (2013.01); *B62D 5/0409* (2013.01)

(58) Field of Classification Search
CPC ........ B62D 1/192; B62D 1/181; B62D 1/185; B62D 1/187; B62D 5/0403; B62D 5/0409; B62D 1/195; B62D 1/184; B62D 1/18; B62D 1/189; B62D 1/19; B62D 1/00; F16F 1/18; G05G 5/06; Y10T 74/20636

USPC ............... 280/775, 777, 779; 74/492, 493
See application file for complete search history.

(56) References Cited

U.S. PATENT DOCUMENTS

| | | | |
|---|---|---|---|
| 8,408,089 B2 | 4/2013 | Oshita et al. | |
| 2007/0151392 A1* | 7/2007 | Oshita | B62D 1/192 |
| | | | 74/493 |
| 2016/0068181 A1* | 3/2016 | Warashina | B62D 1/181 |
| | | | 74/493 |

FOREIGN PATENT DOCUMENTS

| | | |
|---|---|---|
| JP | 2009-298298 A | 12/2009 |
| JP | 2010-36828 A | 2/2010 |
| JP | 2015-83396 A | 4/2015 |

* cited by examiner

*Primary Examiner* — Paul N Dickson
*Assistant Examiner* — Hilary L Johns
(74) *Attorney, Agent, or Firm* — Buchanan Ingersoll & Rooney PC (57) ABSTRACT

A steering device of a vehicle includes: a column housing supported on a vehicle body; a column tube supported to be movable in an axial direction with respect to the column housing and configured to accommodate a steering shaft; and a telescopic mechanism configured to drive the column tube with respect to the column housing in the axial direction. The column tube includes outer and inner tubes, and is configured to allow a relative movement of the outer tube with respect to the inner tube in the axial direction when a load equal to or larger than a predetermined value is applied to the steering shaft. The telescopic mechanism includes a holding member, and a driving mechanism, and is configured to drive the inner and outer tubes with respect to the column housing in the axial direction by the driving mechanism.

6 Claims, 6 Drawing Sheets

STEERING DEVICE OF VEHICLE

CROSS REFERENCE TO RELATED APPLICATIONS

This application is based on and claims priority under 35 U.S.C. § 119 to Japanese Patent Application 2016-184888, filed on Sep. 21, 2016, the entire contents of which are incorporated herein by reference.

TECHNICAL FIELD

This disclosure relates to a steering device of a vehicle, and particularly to a steering device that is provided with a telescopic mechanism capable of adjusting an operation position of a steering wheel in a front-rear direction of a vehicle body.

BACKGROUND DISCUSSION

Regarding a steering device of a vehicle, for example, JP 2009-298298 A (Reference 1) discloses a "steering column" (see paragraphs [0024] to [0029] and FIGS. 1 and 2 of Reference 1), and discloses a "telescopic actuating mechanism" (see paragraphs [0030] to [0032] and FIGS. 6 and 7 of Reference 1). In addition, JP 2015-083396 A (Reference 2) discloses a "steering device that absorbs energy applied to a steering shaft of a vehicle," that is, a steering device of a vehicle which includes an inner tube that accommodates the steering shaft of the vehicle so as to prevent a relative movement of the steering shaft in the axial direction, and to support the steering shaft to be rotatable about an axis and an outer tube that accommodates the inner tube so as to hold the inner tube at a predetermined position in a normal state, and the steering device is configured to allow a relative movement of the inner tube with respect to the outer tube in the axial direction when a load equal to or larger than a predetermined value is applied to the steering shaft (see paragraphs [0001] and [0007] of Reference 2).

The "first tube," "second tube" and "third tube" in the steering column described in Reference 1 respectively correspond to "column housing," "outer tube" and "inner tube" described in Reference 2, and in each steering column, a column tube is constituted with an inner tube that accommodates a steering shaft so as to support the steering shaft to be rotatable about the axis and the outer tube that accommodates the inner tube so as to hold the inner tube at a predetermined position in a normal state. Particularly, as a premise of a unit of absorbing energy applied to the steering shaft, since the steering shaft is supported with respect to the inner tube such that the relative movement of the steering shaft in the axial direction is prevented, the inner tube is made of a high specific gravity material such as iron in order to ensure the required rigidity. In a device including a telescopic actuating mechanism as described in Reference 1, since a "nut frame" constituting the actuating mechanism is fixed to the outer tube (the second tube), the outer tube is also made of a high specific gravity material such as weldable iron. Consequently, both the inner tube and the outer tube constituting the column tube have to be made of a high specific gravity material, and thus not only it is very hard to reduce the weight but also it is difficult to save the space.

Thus, a need exists for a steering device of a vehicle which is not susceptible to the drawback mentioned above.

SUMMARY

An aspect of this disclosure is directed to a steering device of a vehicle including: a column housing supported on a vehicle body; a column tube supported to be movable in an axial direction with respect to the column housing and configured to accommodate a steering shaft; and a telescopic mechanism configured to drive the column tube with respect to the column housing in the axial direction. The column tube includes an outer tube configured to accommodate the steering shaft and support the steering shaft to be rotatable around an axis of the steering shaft, and an inner tube accommodated in the outer tube and configured to hold the outer tube at a predetermined position in a normal state, and the column tube is configured to allow a relative movement of the outer tube with respect to the inner tube in the axial direction when a load equal to or larger than a predetermined value is applied to the steering shaft. The telescopic mechanism includes a holding member supported by the inner tube, and a driving mechanism connected to the holding member and supported by the column housing to drive the holding member in the axial direction, and the telescopic mechanism is configured to drive the inner tube and the outer tube with respect to the column housing in the axial direction by the driving mechanism. The above described "front-rear direction of a vehicle body" does not necessarily mean parallel to a road surface, but includes a direction inclined with the road surface (hereinafter, the same).

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
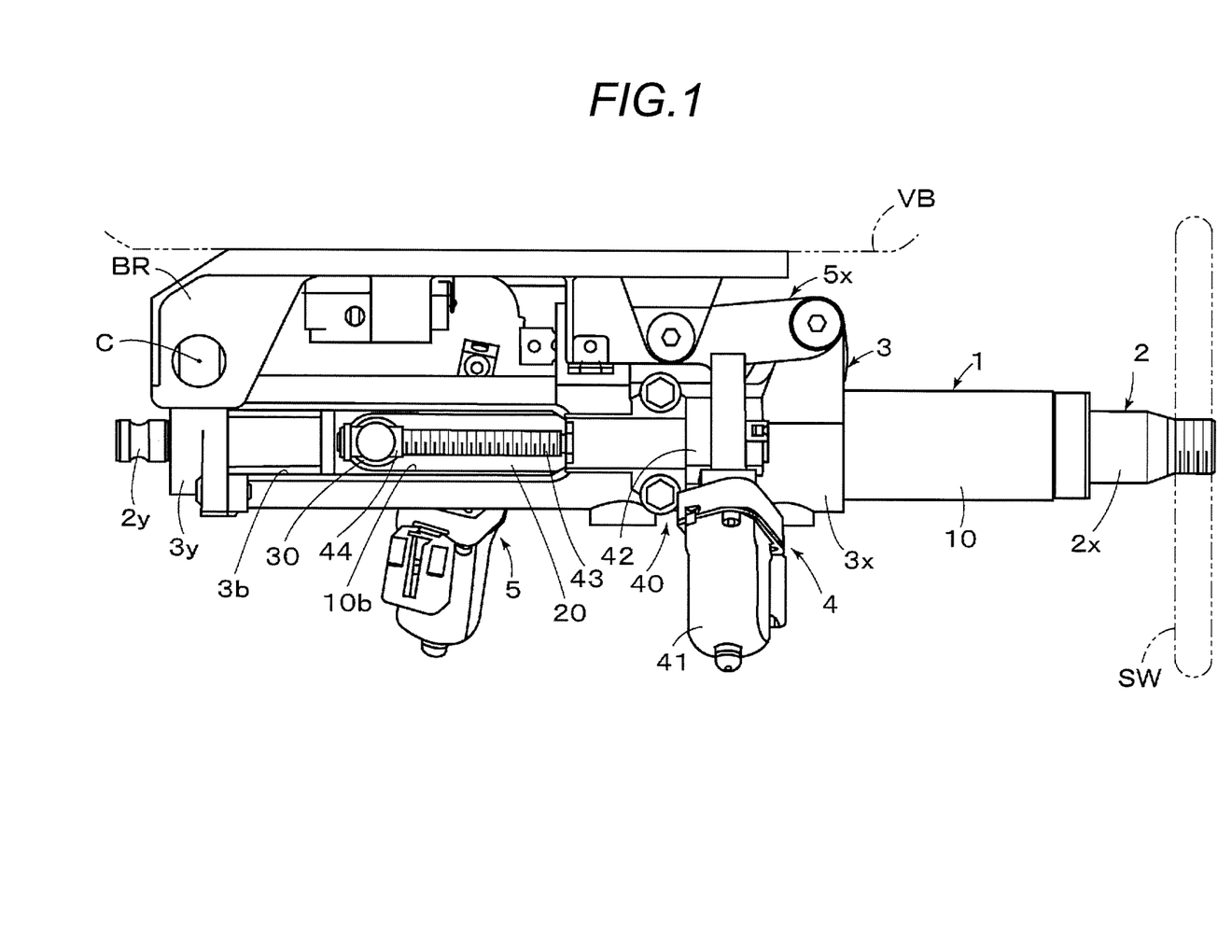
FIG. 1 is a side view of a steering device according to an embodiment disclosed herein.
Figure 2:
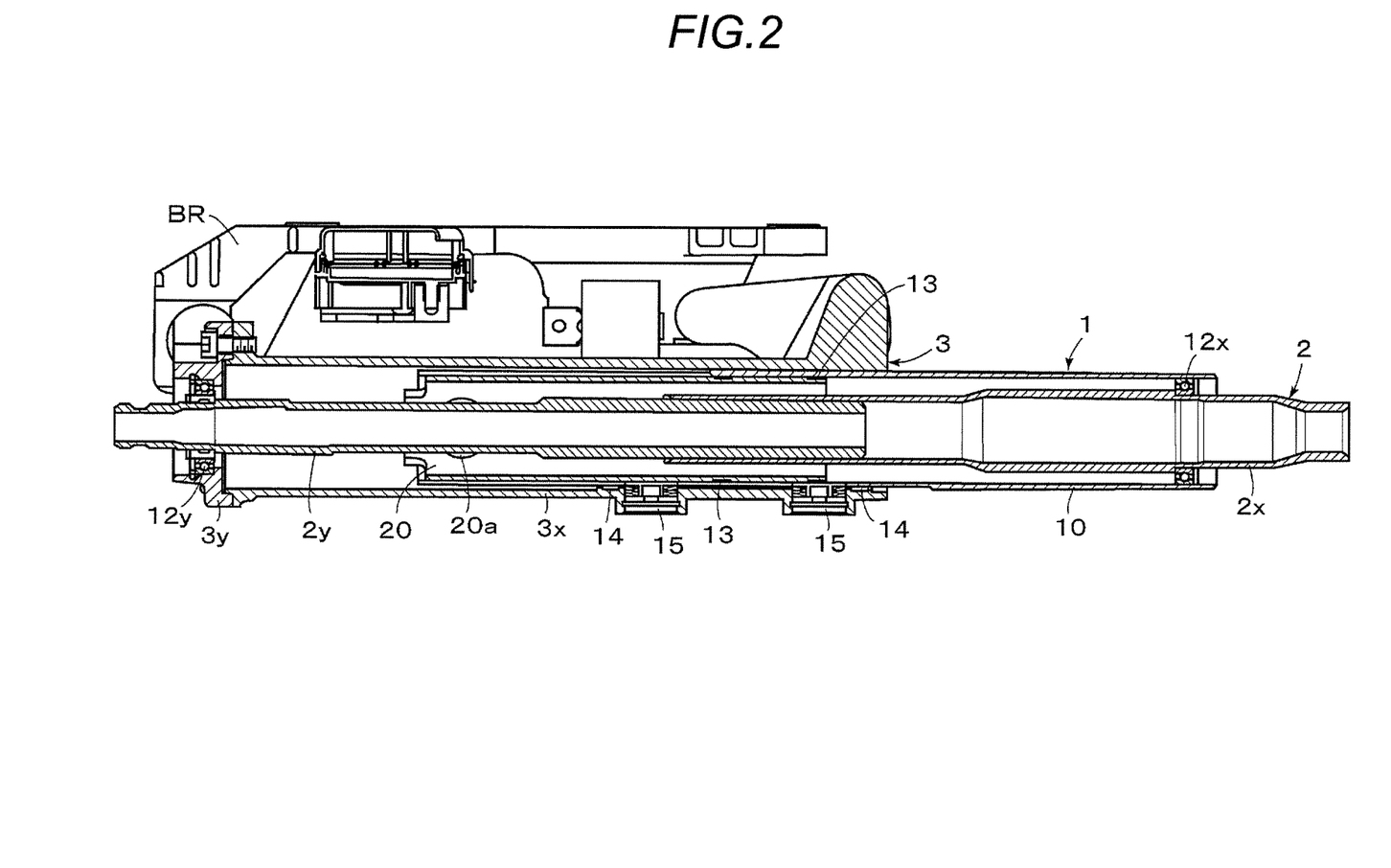
FIG. 2 is a longitudinal sectional view of the steering device according to the embodiment disclosed herein.
Figure 3:
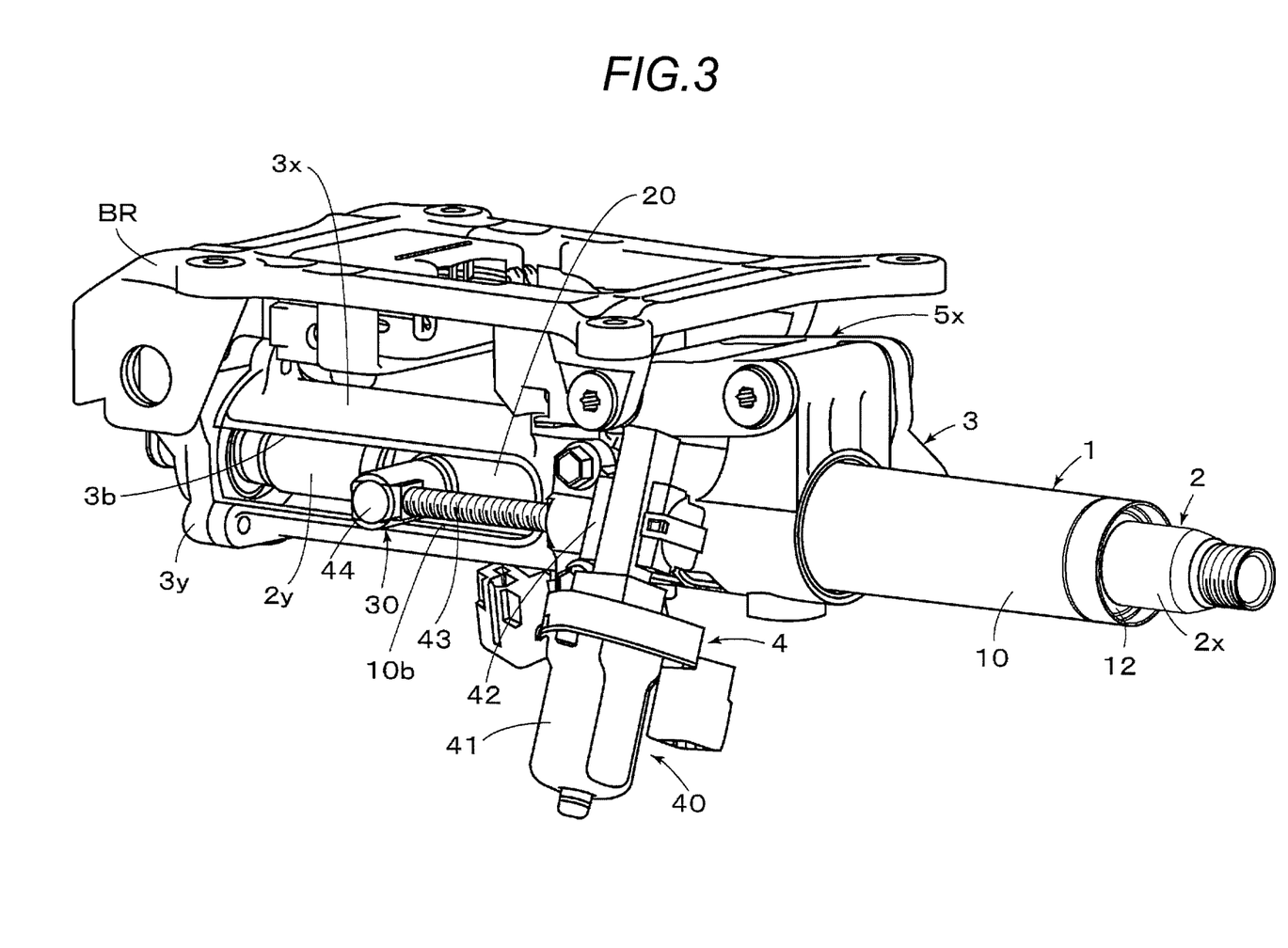
FIG. 3 is a perspective view of the steering device according to the embodiment disclosed herein.

Hereinafter, an embodiment disclosed herein will be described with reference to drawings. FIGS. 1 to 3 illustrate the overall configuration of a steering device according to the embodiment disclosed herein, in which a column tube 1 accommodating a steering shaft 2 is supported to be movable in an axial direction with respect to a column housing 3 supported on a vehicle body VB via a fixing bracket BR, and a telescopic mechanism 4 that drives the column tube 1 in the axial direction is mounted on the column housing 3. The steering shaft 2 of the embodiment includes a tubular upper shaft 2x, the rear end portion of which is connected to a steering wheel SW, and a lower shaft 2y having an outer cylindrical surface splined to an inner cylindrical surface of the upper shaft 2x. The upper shaft 2x and the lower shaft 2y are connected to be relatively movable in the axial direction and relatively non-rotatable, and the front end portion of the lower shaft 2y is connected to a steering mechanism (not illustrated). The steering mechanism is configured to be driven according to the operation of the steering wheel SW and to steer a steering wheel (not illustrated) via a wheel steering mechanism (not illustrated).

The column tube 1 includes an outer tube 10 made of a metal (e.g., iron) and an inner tube 20 made of a metal (e.g., an aluminum alloy), and the inner tube 20 is configured to be accommodated in the outer tube 10 and held at a predetermined position in a normal state. The outer tube 10 is configured to prevent a relative movement of the steering shaft 2 in the axial direction and to support the steering shaft 2 to be rotatable around the axis of the steering shaft 2. That is, a bearing member 12x is interposed between the outer tube 10 and the steering shaft 2 such that the steering shaft 2 is rotatably supported with respect to the outer tube 10 by the bearing member 12x, and the relative movement of the steering shaft 2 in the axial direction is prevented by the bearing member 12x.

In addition, metallic annular spring members 13, 13 are interposed between the outer tube 10 and the inner tube 20 such that the relative movement between the inner tube 20 and the outer tube 10 in the axial direction is restricted by the annular spring members 13, 13. Therefore, the outer tube 10 is held at a predetermined position with respect to the inner tube 20 in the normal state. Meanwhile, when a load equal to or larger than a predetermined value is applied to the steering shaft 2, the relative movement of the outer tube 10 with respect to the inner tube 20 in the axial direction is allowed, and the outer tube 10 is configured to move in the axial direction integrally with the steering shaft 2. The outer tube 10 and the inner tube 20 serve as energy absorbing means together with the annular spring members 13, 13 or the like interposed therebetween. The annular spring members 13, 13 are formed in a C shape by stainless steel similarly to the annular spring member disclosed in, for example, the above described Reference 2, and has a plurality of protruding portions (not illustrated) having a hat-shaped cross section and formed evenly over the entire circumference thereof. Each of the spring members 13, 13 is arranged such that the side constituting a top portion of the hat-shaped cross section of each protruding portion becomes an inner peripheral surface, and the side constituting a flange portion of the hat-shaped cross section becomes an outer peripheral surface.

As illustrated in FIG. 2, the outer tube 10 is supported by the column housing 3 via a pair of bushings 14, 14 serving as sliding bearings. The outer tube 10 is pressed against the inner surface of the column housing 3 and held by a pair of pressing mechanisms 15, 15. The bushings 14, 14 may be made of a resin, but may be preferably made of a metal. Each of the pressing mechanisms 15, 15 is the same as a mechanism using a disc spring conventionally called a friction mechanism, and may secure a sliding ability in the thrust direction without causing rattle in the steering wheel SW, but does not serve as energy absorbing means between the column housing 3 and the outer tube 10.

Figure 5:
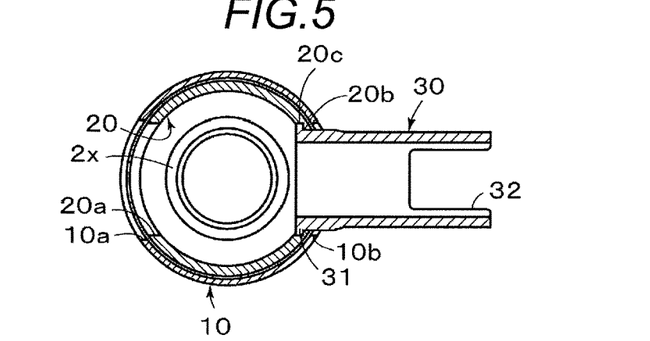
FIG. 5 is a cross-sectional view of the outer tube, the inner tube, and the holding member which are included in the embodiment disclosed herein.

As illustrated In FIGS. 1 to 3, the telescopic mechanism 4 of the embodiment includes a holding member 30 supported by the inner tube 20, and a driving mechanism 40 connected to the holding member 30 and supported by the column housing 3 to drive the holding member 30 in the axial direction. The telescopic mechanism 4 is configured to drive the column tube 1 (the inner tube 20 and the outer tube 10) with respect to the column housing 3 in the axial direction by the driving mechanism 40. In the embodiment, as illustrated in FIG. 5, the holding member 30 is inserted through an opening 20a formed on one side of the inner tube 20, and is supported by an opening 20b formed on the other side. Thus, the column tube 1, the steering shaft 2, and the steering wheel SW integrally move with respect to the column housing 3 in the axial direction, and the steering wheel SW may be adjusted to a desired position in the front-rear direction of the vehicle body.

Figure 7:
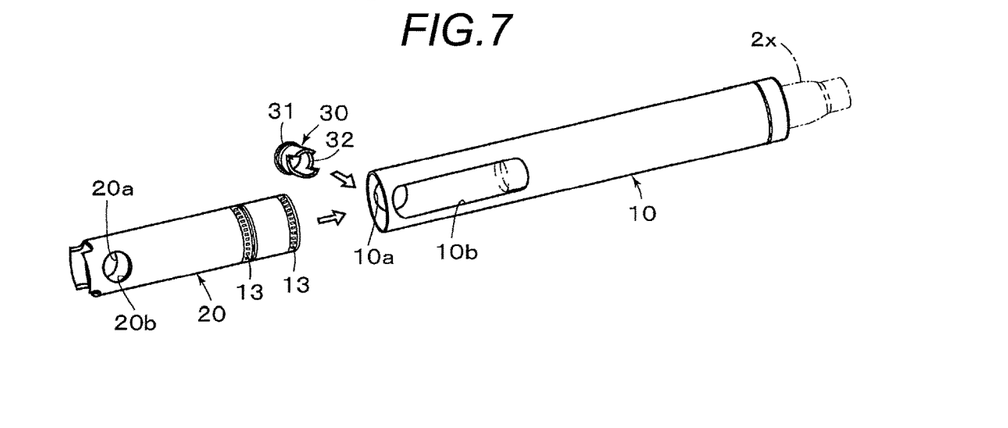
FIG. 7 is an exploded perspective view of the outer tube, the inner tube, and the holding member which are included in the embodiment disclosed herein.

As illustrated in FIG. 7, the opening 10a, into which the holding member 30 is inserted, and the opening 10b, which extends in the longitudinal direction (the axial direction of the outer tube 10), are formed in the outer tube 10 according to the embodiment. The holding member 30 is inserted through the opening 10b to be connected to the driving mechanism 40. Therefore, the holding member 30 is allowed to be moved in the axial direction within the opening 10b, but is not allowed to be moved at both ends of the opening 10b in the axial direction. That is, after the outer tube 10 and the inner tube 20 are assembled as described below, even when a tensile force directed to the rear side of the vehicle (toward the driver) is applied to the steering wheel SW, the holding member 30 is locked at the position where the holding member 30 is abutted on the front end of the opening 10b in the axial direction. Thus, the outer tube 10 does not fall off, and the opening 10b and the holding member 30 function to lock the outer tube 10. As illustrated in FIGS. 1 and 2, the column housing 3 includes a main body 3x and a lower bracket 3y that is joined to the main body 3x so as to close one side end face of the main body 3x. An opening 3b including the opening 10b of the outer tube 10 is formed in the main body 3x, and an opening end of the main body 3x in the axial direction is closed by the lower bracket 3y. That is, the opening 3b is formed as illustrated in FIGS. 1 and 2 in consideration of ease of assembly.

As the driving mechanism 40 of the embodiment, an electric motor 41 supported by the column housing 3 is used, and a screw shaft 43 connected to the output shaft of the electric motor 41 via a decelerating mechanism 42, and a nut member (referred to as a telescopic nut) 44 screwed to the screw shaft 43 and serving as a slider are held by the holding member 30. The output of the electric motor 41 is properly decelerated by the decelerating mechanism 42, and is transmitted to the screw shaft 43. Thus, the nut member 44 (and the holding member 30) moves in the axial direction of the screw shaft 43 according to the rotational driving of the screw shaft 43 by the electric motor 41, and the holding member 30, eventually the column tube 1, the steering shaft 2, and the steering wheel SW are configured to move in the front-rear direction of the vehicle body. As illustrated in FIG. 1, the column housing 3 of the embodiment is swingably supported by the fixing bracket BR via a link mechanism 5x around a swing center C, by which an electric tilt mechanism 5 is constituted. However, the electric tilt mechanism 5 is not directly related to the disclosure, and thus explanation thereof will be omitted.

Figure 4:
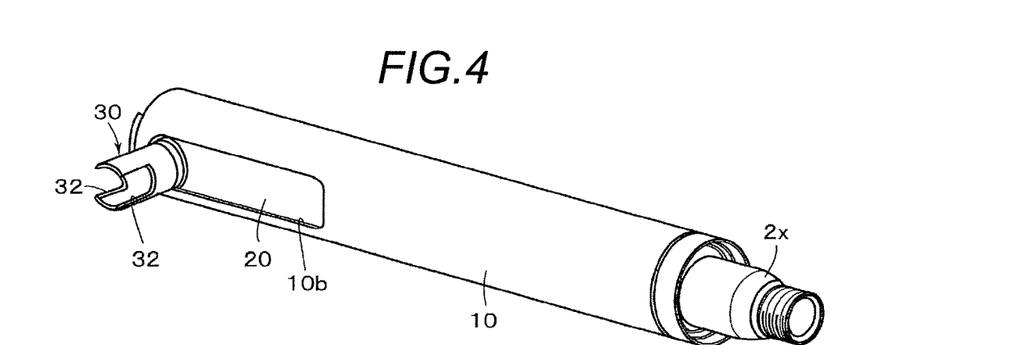
FIG. 4 is a perspective view illustrating an outer tube, an inner tube, a holding member, and an upper shaft which are included in the embodiment disclosed herein and extracted from FIG. 3.
Figure 6:
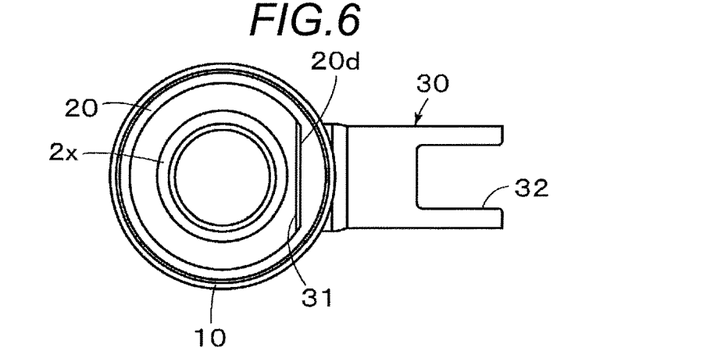
FIG. 6 is a front view of the outer tube, the inner tube, and the holding member which are included in the embodiment disclosed herein.

FIG. 4 illustrates the outer tube 10, the inner tube 20, and the holding member 30 (and the upper shaft 2x) extracted from FIG. 3, and FIG. 5 illustrates a cross section of a portion including the holding member 30. As illustrated in FIGS. 4 and 5, the holding member 30 has a tubular shape, and has a flange portion 31 formed at one end thereof, and notches 32, 32 formed on opposite sides thereof. The nut member 44 is accommodated in the holding member 30 from the other end side of the holding member 30 (illustrated in FIGS. 1 to 3), and the opposite ends of the nut member 44 are fitted into the notches 32, 32, respectively. Therefore, the inside of the opening 20a of the inner tube 20 has a diameter larger than the flange portion 31 so that the holding member 30 may be inserted therethrough. As illustrated in FIG. 5, an annular groove 20c is formed in the opening 20b of the inner tube 20, and the flange portion 31 is fitted in the annular groove 20c. As illustrated in FIG. 6 that illustrates a state where the holding member 30 is mounted in the inner tube 20 when viewed from the front side of the vehicle, a planar portion 20d is formed on the inner surface of the inner tube 20 in the axial direction, and the annular groove 20c is formed in the planar portion 20d.

Figure 8A:
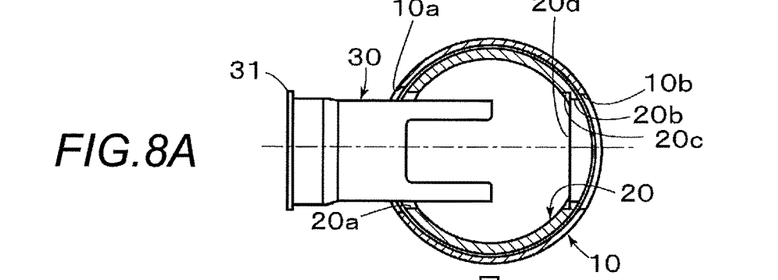
FIGS. 8A to 8C are partial sectional views illustrating a process of assembling the outer tube, the inner tube, and the holding member which are included in the embodiment disclosed herein.
Figure 8B:
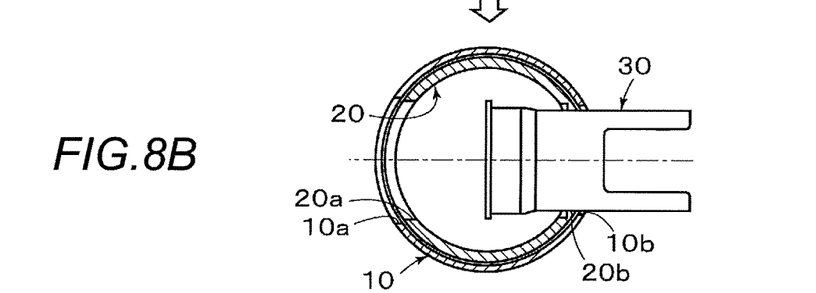
Figure 8C:
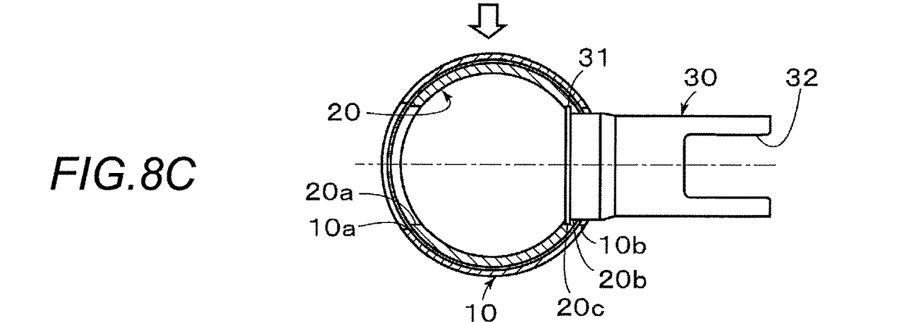

An assembly procedure of the steering device configured as described above will be described below with reference to FIG. 7 and FIGS. 8A to 8C. First, the bearing member 12x (illustrated in FIG. 2) is held within the outer tube 10. As illustrated in FIG. 7, in a state where the annular spring members 13, 13 are mounted on the inner tube 20, the inner tube 20 is inserted into the outer tube 10, and the openings 10a and 10b of the outer tube 10 are brought into alignment with the openings 20a and 20b of the inner tube 20, respectively. In this state, the holding member 30 is inserted from the opening 20a of the inner tube 20 (and the opening 10a of the outer tube 10) as illustrated in FIG. 8A, and is inserted through the opening 20b of the inner tube 20 (and the opening 10b of the outer tube 10) as illustrated in FIG. 8B. As illustrated in FIG. 8C, the flange portion 31 of the holding member 30 is fitted into the annular groove 20c, and the holding member 30 is fixed to the opening 20b by, for example, press-fitting.

In this way, the holding member 30 may be assembled from the inside with respect to the inner tube 20 so that the holding member 30 may be easily and properly fixed to the opening 20b (and the annular groove 20c) and reliably prevented from falling off from the inner tube 20 by the flange portion 31. It is also possible to assemble the holding member 30 from the outside with respect to the inner tube 20, and to fix the holding member 30 by, for example, welding, riveting, screwing, bonding, deposition or the like. However, as illustrated in FIGS. 8A to 8C, it is desirable that the holding member 30 is press-fitted from the inside of the inner tube 20. That is, in the configuration as illustrated in FIGS. 4 to 6, not only it is possible to easily assemble the holding member 30 to the inner tube 20, but also it is possible to employ a structure where the assembled holding member 30 is prevented from falling off even when an external force is applied in a direction of pulling out the holding member 30 (the flange portion 31 is fitted into the annular groove 20c). Thus, a joining process such as welding is not necessary, and cost reduction is enabled.

Meanwhile, the upper shaft 2x is connected to the lower shaft 2y to constitute the steering shaft 2, and as illustrated in FIG. 2, the lower bracket 3y is mounted to the front end portion of the lower shaft 2y via a bearing member 12y. Then, the distal end side of the upper shaft 2x is inserted into the outer tube 10, and is held while locked by the bearing member 12x to constitute a subassembly (not illustrated). The subassembly is accommodated in the column housing 3 mounted with the bushings 14, 14 and the pressing mechanisms 15, 15, and is held as illustrated in FIG. 2.

In the case where the telescopic mechanism 4 configured as described above is driven, when the electric motor 41 is activated such that the output shaft of the electric motor 41 is rotationally driven, the output of the electric motor 41 is decelerated via the decelerating mechanism 42, and then transmitted to the screw shaft 43. The nut member 44 screwed to the screw shaft 43 moves in the axial direction, and the column tube 1 moves in the axial direction together with the holding member 30 that accommodates the nut member 44. Thus, the steering shaft 2 and the steering wheel SW move in the axial direction together with the column tube 1. When the electric motor 41 is stopped when the steering wheel SW has reached the desired position in the front-rear direction of the vehicle body, the steering wheel SW may be adjusted to a desired operation position.

Figure 9:
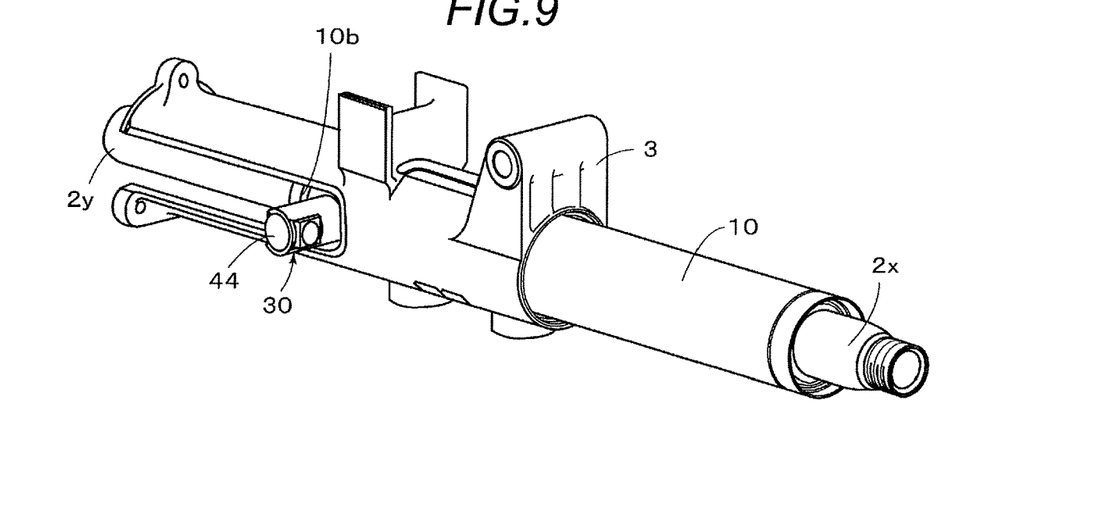
FIG. 9 is a perspective view illustrating a positional relationship of the outer tube, the inner tube, and the holding member when a steering wheel is adjusted to an operation position closest to a driver in the embodiment disclosed herein.
Figure 10:
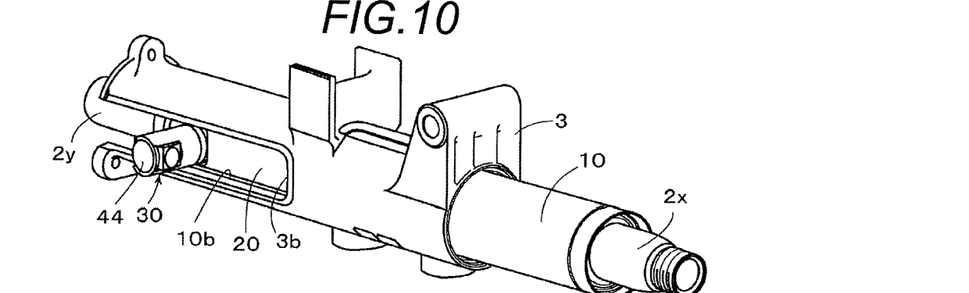
FIG. 10 is a perspective view illustrating a positional relationship of the outer tube, the inner tube, and the holding member when a steering wheel is adjusted to an operation position most distant from a driver in the embodiment disclosed herein.
Figure 12:
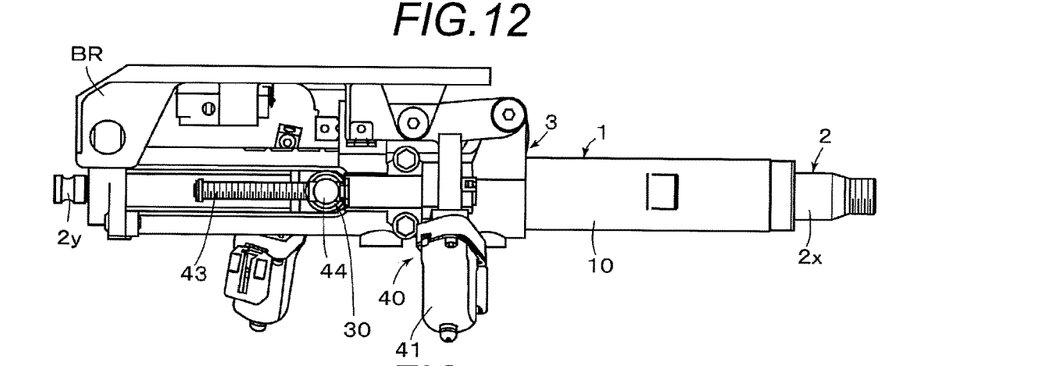
FIG. 12 is a side view illustrating a state where the steering wheel is adjusted to the operation position closest to the driver in the steering device according to the embodiment disclosed herein.

FIGS. 9 and 10 illustrate a positional relationship between the upper shaft 2x, the column housing 3, the outer tube 10, the inner tube 20, and the holding member 30 in a state where the steering wheel SW is adjusted to the rearmost position of the vehicle body, that is, an operation position closest to a driver, and in a state where the steering wheel SW is adjusted to the frontmost position of the vehicle body, that is, an operation position most distant from the driver, respectively. In FIG. 9, the rear end face of the holding member 30 is abutted on the opening 10b of the outer tube 10, and thus the column tube 1 is locked at the rearmost position. The state of the whole steering device at this time is illustrated in FIG. 12. Meanwhile, in FIG. 10, the front end face of the holding member 30 is abutted on the opening 10b of the outer tube 10, and the column tube 1 is locked at the frontmost position. In either case, since an abutting area required for preventing movement of the holding member 30 is secured due to the sides of both end portions of the opening 10b of the outer tube 10 in the axial direction, the movement of the column tube 1 may be reliably prevented at a locking position, and the stroke amount of the steering wheel SW may be properly restricted. The holding member 30 is arranged not to be abutted on the opening 3b of the column housing 3, but may be configured to be abutted on the opening 3b.

Figure 11:
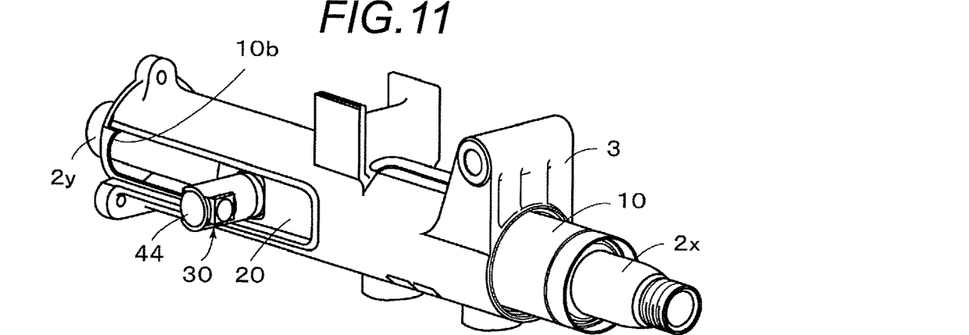
FIG. 11 is a perspective view illustrating a positional relationship of the outer tube, the inner tube, and the holding member after energy absorption in the embodiment disclosed herein.
Figure 13:
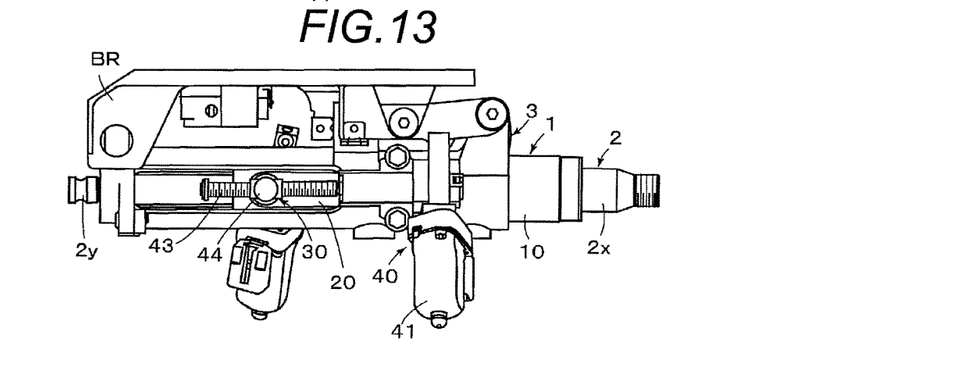
FIG. 13 is a side view illustrating a state after energy absorption in the steering device according to the embodiment disclosed herein.

The energy absorption operation in the embodiment is performed as follows. For example, in a normal state illustrated in FIG. 2, when a load equal to or larger than a predetermined value is applied to the steering wheel SW from the rear side, the outer tube 10 integrally connected to the upper shaft 2x moves with respect to the inner tube 20 in the axial direction. That is, the outer tube 10, together with the steering shaft 2 and the steering wheel SW, moves forward from a position in the normal state illustrated in FIG. 2, moves to a predetermined stop position, and is placed in, for example, a state illustrated in FIG. 11. In the meantime, energy generated by an excessive load applied to the steering wheel SW toward the front side of the vehicle is properly absorbed by the movement of the outer tube 10, the steering shaft 2, and the steering wheel SW. That is, when an excessive load equal to or larger than a predetermined value acts on the steering wheel SW, the outer tube 10 moves forward against the biasing force of the annular spring members 13,13 interposed between the outer tube 10 and the inner tube 20, and thus the energy is absorbed. The state of the whole steering device after energy absorption is illustrated in FIG. 13.

As described above, since the steering shaft 2 is held by the outer tube 10, and is not held by the inner tube 20, the inner tube 20 may be made thin or small in diameter, and the weight thereof may be reduced. In addition, it is not necessary to form the inner tube 20 using a high specific gravity material as in the related art, a low specific gravity material such as an aluminum alloy may be used, and a synthetic resin may also be used. Thus, it is possible to further reduce the weight.

An aspect of this disclosure is directed to a steering device of a vehicle including: a column housing supported on a vehicle body; a column tube supported to be movable in an axial direction with respect to the column housing and configured to accommodate a steering shaft; and a telescopic mechanism configured to drive the column tube with respect to the column housing in the axial direction. The column tube includes an outer tube configured to accommodate the steering shaft and support the steering shaft to be rotatable around an axis of the steering shaft, and an inner tube accommodated in the outer tube and configured to hold the outer tube at a predetermined position in a normal state, and the column tube is configured to allow a relative movement of the outer tube with respect to the inner tube in the axial direction when a load equal to or larger than a predetermined value is applied to the steering shaft. The telescopic mechanism includes a holding member supported by the inner tube, and a driving mechanism connected to the holding member and supported by the column housing to drive the holding member in the axial direction, and the telescopic mechanism is configured to drive the inner tube and the outer tube with respect to the column housing in the axial direction by the driving mechanism. The above described "front-rear direction of a vehicle body" does not necessarily mean parallel to a road surface, but includes a direction inclined with the road surface (hereinafter, the same).

In the steering device, it is preferable that the steering device further includes a bearing member interposed between the outer tube and the steering shaft so as to allow the steering shaft to be rotatably supported with respect to the outer tube, and to prevent a relative movement of the steering shaft in the axial direction.

In the steering device, it is preferable that the steering device further includes a spring member interposed between the inner tube and the outer tube so as to restrict a relative movement between the inner tube and the outer tube in the axial direction. As the spring member, an annular spring member including a C shape may be used.

It is preferable that the outer tube has an opening that allows the holding member to move in the axial direction, and the holding member is inserted through the opening to be connected to the driving mechanism. It is preferable that the opening of the outer tube is an opening whose longitudinal direction aligns with an axial direction of the outer tube, and may be configured to prevent movement of the holding member at both ends of the opening in the axial direction.

It is preferable that the holding member is inserted through one side of the inner tube and is supported by another side of the inner tube to be connected to the driving mechanism. It is preferable that the holding member is configured as a tubular body having a flange portion at one end thereof, and the inner tube includes a first opening which is formed on the one side of the inner tube and through which the holding member is inserted, and a second opening which is formed on the another side of the inner tube at a position opposite to the first opening and has an annular groove formed inside the inner tube, and the holding member is inserted through the second opening such that the flange portion is fitted into the annular groove.

It is preferable that the driving mechanism includes an electric motor supported by the column housing, a screw shaft connected to an output shaft of the electric motor, and a nut member screwed to the screw shaft and held by the holding member, and according to the rotational driving of the screw shaft by the electric motor, the nut member moves in an axial direction of the screw shaft, and the holding member may move in the axial direction together with the nut member so that the column tube moves in a front-rear direction of a vehicle body.

Since the aspect of this disclosure is configured as described above, the following effects are obtained. That is, in the steering device of a vehicle which includes: a column housing supported on a vehicle body; a column tube accommodating a steering shaft and supported with respect to the column housing to be movable in an axial direction; and a telescopic mechanism that drives the column tube with respect to the column housing in the axial direction, the aspect of this disclosure is configured such that the column tube includes an outer tube configured to accommodate the steering shaft and support the steering shaft to be rotatable around the axis of the steering shaft, and an inner tube accommodated in the outer tube and configured to hold the outer tube at a predetermined position in a normal state, and the column tube is configured to allow a relative movement of the outer tube with respect to the inner tube in the axial direction when a load equal to or larger than a predetermined value is applied to the steering shaft. The telescopic mechanism includes a holding member supported by the inner tube, and a driving mechanism connected to the holding member and supported by the column housing to drive the holding member in the axial direction, and the telescopic mechanism is configured to drive the inner tube and the outer tube with respect to the column housing in the axial direction by the driving mechanism. Thus, since the thickness of the inner tube may be reduced and the material of the inner tube may be changed to a low specific gravity material, it is possible to achieve weight reduction and space saving.

When the steering device includes a bearing member interposed between the outer tube and the steering shaft so as to allow the steering shaft to be rotatably supported with respect to the outer tube, and to prevent a relative movement of the steering shaft in the axial direction, the load of the steering shaft may be borne by the outer tube, and a large load may be avoided from being applied to the inner tube. Therefore, it is possible to reduce the thickness of the inner tube and change the material of the inner tube to a low specific gravity material, so that the inner tube may be made of a synthetic resin and it is possible to achieve further weight reduction and space saving.

When the steering device includes a spring member interposed between the inner tube and the outer tube so as to restrict a relative movement between the inner tube and the outer tube in the axial direction, the outer tube moves forward against the biasing force of the spring member when a large load is applied to the steering shaft, so that energy is properly absorbed. When an annular spring member including a C shape may be used as the spring member, and the spring member is accommodated in the outer tube in the state where the spring member is mounted on the inner tube, the assembly process is facilitated.

When the outer tube has an opening that allows the holding member to move in the axial direction and the holding member is configured to be inserted through the opening to be connected to the driving mechanism, it is possible to easily and properly secure the relative movement between the inner tube and the outer tube in the axial direction. Particularly, when the opening of the outer tube is an opening whose longitudinal direction aligns with an axial direction of the outer tube, and is configured to prevent movement of the holding member at both ends of the opening in the axial direction, it is possible to properly set the movable distance of the holding member, and even when a tensile force directed to the rear side of the vehicle is applied to the steering shaft, the holding member is locked at the position where the holding member is abutted on the front end of the opening in the axial direction. Therefore, the opening is also capable of effectively functioning to lock the outer tube.

When the holding member is configured such that the holding member is inserted through one side of the inner tube to be supported by the other side of the inner tube and to be connected to the driving mechanism, the holding member may be easily and properly supported by the inner tube. Particularly, when the holding member is configured as a tubular body having a flange portion at one end thereof, and the inner tube includes a first opening formed on one side of the inner tube and a second opening formed on the other side of the inner tube at a position opposite to the first opening, through which the holding member is inserted, the second opening has an annular groove formed inside the inner tube, and the holding member inserted into the second opening so that the flange portion is fitted into the annular groove, the holding member may be easily and properly fixed to the inner tube, so that it is possible to reliably prevent the holding member from falling off from the inner tube.

In the steering device, when the driving mechanism includes an electric motor supported by the column housing, a screw shaft connected to an output shaft of the electric motor, and a nut member screwed to the screw shaft and held by the holding member, and according to the rotational driving of the screw shaft by the electric motor, the nut member moves in an axial direction of the screw shaft, and the holding member moves in the axial direction together with the nut member so that the column tube moves in a front-rear direction of a vehicle body, it is possible to configure a telescopic mechanism that is capable of securing a smooth movement in the axial direction without requiring a large space.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A steering device of a vehicle, the steering device comprising:
    a column housing supported on a vehicle body;
    a column tube supported to be movable in an axial direction with respect to the column housing and configured to accommodate a steering shaft; and
    a telescopic mechanism configured to drive the column tube with respect to the column housing in the axial direction,
    wherein the column tube includes
        an outer tube configured to accommodate the steering shaft and support the steering shaft to be rotatable around an axis of the steering shaft, and
        an inner tube accommodated in the outer tube and configured to hold the outer tube at a predetermined position in a normal state, and
        the column tube is configured to allow a relative movement of the outer tube with respect to the inner tube in the axial direction when a load equal to or larger than a predetermined value is applied to the steering shaft, and
    the telescopic mechanism includes
        a holding member supported by the inner tube, and
        a driving mechanism connected to the holding member and supported by the column housing to drive the holding member in the axial direction, and
        the telescopic mechanism is configured to drive the inner tube and the outer tube with respect to the column housing in the axial direction by the driving mechanism,
    the outer tube has an opening that allows the holding member to move in the axial direction, and the holding member is inserted through the opening to be connected to the driving mechanism, and
    the holding member is inserted through one side of the inner tube and is supported by another side of the inner tube to be connected to the driving mechanism.

2. The steering device of the vehicle according to claim 1, further comprising a bearing member interposed between the outer tube and the steering shaft so as to allow the steering shaft to be rotatably supported with respect to the outer tube, and to prevent a relative movement of the steering shaft in the axial direction.

3. The steering device of the vehicle according to claim 1, further comprising a spring member interposed between the inner tube and the outer tube so as to restrict a relative movement between the inner tube and the outer tube in the axial direction.

4. The steering device of the vehicle according to claim 1, wherein the opening of the outer tube is an opening whose longitudinal direction aligns with an axial direction of the outer tube, and is configured to prevent movement of the holding member at both ends of the opening in the axial direction.

5. The steering device of the vehicle according to claim 1, wherein the holding member is configured as a tubular body having a flange portion at one end thereof,
    the inner tube includes a first opening which is formed on the one side of the inner tube and through which the holding member is inserted and a second opening which is formed on the another side of the inner tube at a position opposite to the first opening and has an annular groove formed inside the inner tube, and the holding member is inserted through the second opening such that the flange portion is fitted into the annular groove.

6. The steering device of the vehicle according to claim 1, wherein the driving mechanism includes an electric motor supported by the column housing, a screw shaft connected to an output shaft of the electric motor, and a nut member screwed to the screw shaft and held by the holding member, and according to rotational driving of the screw shaft by the electric motor, the nut member moves in an axial direction of the screw shaft, and the holding member moves in the axial direction together with the nut member so that the column tube moves in a front-rear direction of a vehicle body.

\* \* \* \* \*